UNITED STATES PATENT OFFICE.

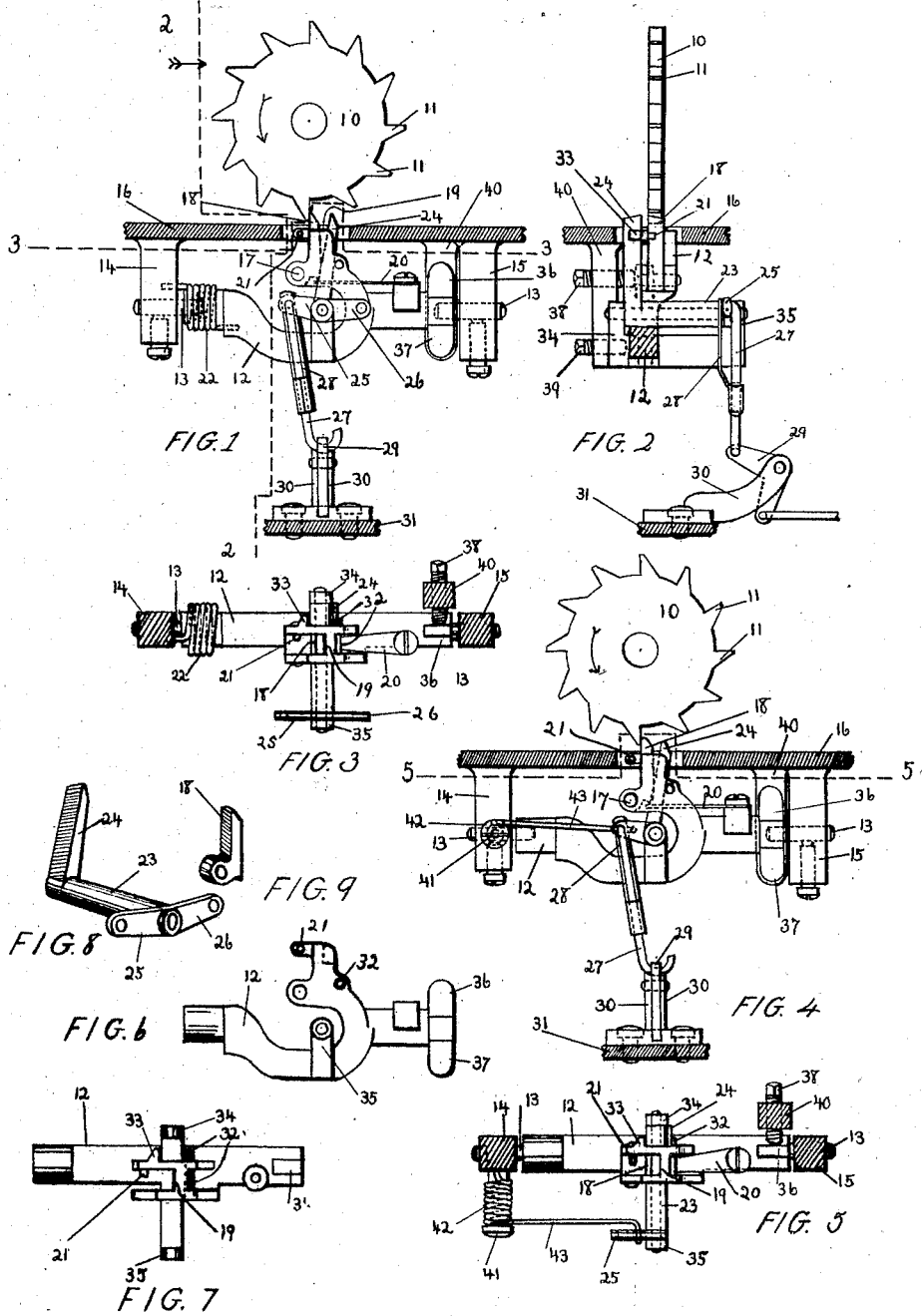

LOUIS P. DISS, OF ILION, NEW YORK.

TYPE-WRITER ESCAPEMENT.

1,021,182.  Specification of Letters Patent.  Patented Mar. 26, 1912.

Application filed September 3, 1910. Serial No. 580,389.

*To all whom it may concern:*

Be it known that I, LOUIS P. DISS, of Ilion, in the county of Herkimer and State of New York, have invented certain new and useful Improvements in Type-Writer Escapements; and I do hereby declare that the following is a full, clear, and exact description thereof, which will enable others skilled in the art to which it appertains to make and use the same, reference being had to the accompanying drawings, and to the reference-numerals marked thereon, which form part of this specification.

The object of my invention is to provide a more speedy and more suitable typewriter escapement for the ordinary operator than has heretofore been provided. For this purpose I have provided for the release of the carriage instantaneously with the commencement of the return movement of the type from the platen, and for a greater repulsing effect of the carriage spring on the type bars and finger keys than has heretofore been provided.

A further object of my invention is to provide for readily converting this escapement from its regular action to what is known as a "reverse acting escapement" which is only suitable for expert operators. In this class of escapement the carriage is released before the type reach the platen, therefore the regularity of spacing depends on the uniform operation of the finger keys.

Figure 1, is a vertical sectional view looking from front to back of part of a typewriter embodying my form of escapement. Fig. 2, is a vertical sectional view on line 2—2 of Fig. 1. Fig. 3, is a horizontal sectional view on line 3—3 of Fig. 1. Fig. 4, is a view similar to Fig. 1 of a modified form. Fig. 5, is a vertical sectional view on line 5—5 of Fig. 4. Fig. 6, is a front elevation of the dog rocker. Fig. 7, is a plan view of the dog rocker. Fig. 8, is a perspective view of the holding dog 24, the rock shaft 23, and the arms 25 and 26. Fig. 9, is a perspective view of the spacing dog.

The escapement wheel 10 having the usual teeth 11, is mounted to revolve in a vertical plane parallel to the line of the movement of the carriage and operatively connected therewith and with the main spring in the usual well known manner, not shown in the drawings. The tension of the main spring is to revolve the escapement wheel in the direction indicated thereon in the drawing by an arrow.

The dog rocker 12 is mounted on pivots 13 supported by posts 14 and 15 extending down from the top plate 16. The axis of the dog rocker is at right angles to the axis of the escapement wheel. Pivotally mounted at 17 on the dog rocker 12 and having its pivotal axis at right angles with the axis of the dog rocker, is the stepping or spacing dog 18 which extends upwardly through an opening in the top plate 16 and engages a tooth 11 of the escapement wheel when the machine is not being operated which is the position of the parts in Figs. 1–5, and which for convenience I will call the normal position. A shoulder 19 upon the dog rocker limits the movement of the spacing dog 18 in its movement toward the right as shown in Figs. 1 and 4 at a point where the spacing dog will hold one of the teeth 11 of the escapement wheel 10 at desired position in the usual manner. A spring 20 secured to the rocker 12, bears upon the spacing dog so as to throw it toward the left as viewed in Figs. 1 and 4, when the rocking movement of the rocker 12 carries the spacing dog out of engagement with the escapement wheel. A stop 21 upon the rocker limits this movement of the spacing dog at the desired point. A spring 22 bearing against the post 14 and the rocker 12 is tensioned to force the rocker to swing on its axis to normal position, viz: to the position where the spacing dog 18 is in line to engage the teeth of the escapement wheel as in Figs. 1–5.

Pivotally mounted upon arms 34 and 35 outwardly extending from the dog rocker 12 and having their ends bent upward is a rock shaft 23, having its axis at right angles with the axis of the dog rocker. Upon this rock shaft 23 the holding dog 24 is located and extends upward sufficiently to allow of engagement with the escapement wheel 10. This rock shaft extends beyond the axis of the dog rocker upon the side opposite the holding dog and is there provided with an arm 25 extending to the left as viewed in Figs. 1 and 4, and in the form shown in Figs. 1–3, also with an arm 26 extending to the right as viewed in Fig. 1. To the end of arm 25 is pivotally connected the upper end of the wire 27 the bent end of which enters a hole near the end of the arm 25 and is held therein by a spring holder 28 secured to the wire 27. This spring fastening allows the wire 27 to be readily disconnected from the arm 25 and connected to the opposite arm 26 which also has a hole for the bent end of the wire, for the purpose set out fully hereafter. The lower end of the wire 27 is connected to one end of a bell crank 29 pivoted upon arms 30 secured to the base plate 31 and by means of this bell crank 29 connection is made in the usual way, not shown, to the key lever and universal bar, in such manner that a depression of the finger keys will cause a downward pull on the wire 27.

The movement of the holding dog 24 toward the right as shown in Figs. 1 and 4, that is its motion when returned to normal position of rest, is limited by a stop 32 upon the dog rocker 12. A shoulder 33 upon the rocker arrests the forward motion of the holding dog 24 when its engaging face has been brought into line with the tooth 11, then engaged by the spacing dog. Ears 36 and 37 project from the dog rocker 12 and limit the rocking movement of the dog rocker in either direction by their coming in contact with stop screws 38 and 39 respectively mounted in a post 40 depending from the top plate 16. It is now evident that when the finger keys are manipulated a downward pull will be communicated to the wire 27, and to the arm 25, and this will move the holding dog 24 toward the escapement wheel or to the left as shown in Figs. 1 and 4, until by shoulder 33 the holding dog is stopped with its face in line with the face of the spacing dog 18 and in line also with the face of the tooth 11 then engaged by the spacing dog. The downward pressure upon the arm 25 will also rock the dog rocker 12 upon its pivots 13 and thereby swing the spacing dog 18 out of engagement with the tooth 11 of the escapement wheel, and will swing the holding dog 24 into engagement with the same tooth. As soon as the spacing dog 18 is out of engagement with the tooth of the escapement wheel, it is forced forward by the spring 20 ready to engage the next tooth of the escapement wheel as soon as the dog rocker is allowed to swing back toward normal position. During the downward pressure upon the finger key, the type has come to printing position on the platen and then just as soon as the downward pressure upon the finger key is released, the holding dog 24 is free to be forced backward by the engaged tooth of the escapement wheel and the tension of the main spring exerted through this tooth does at once force the holding dog 24 back toward its normal position. The release of the pressure upon the finger key also meanwhile allows the spring 22 to return the dog rocker 12 to normal position, and thereby again bring the spacing dog 18 into engagement with the escapement wheel and withdraw the holding dog 24 entirely from engagement therewith. The advantage of my invention is that the escapement motion begins instantaneously with the release of pressure upon the finger key and does not have to wait for the holding dog to be moved out of the path of the escapement member, but the holding dog is itself forced backward while it is being withdrawn from the path of the escapement member.

The modification shown in Figs. 4 and 5 consists in substituting for the spring 22, a spring 42 coiled about a pin 41 projecting from the post 14, the free end 43 of the spring 42 being hooked into the arm 25 and exerting an upward tension thereon. This connection of the spring tends to swing the holding dog 24 backward before swinging the dog rocker 12 toward its normal position. It will also be observed that in my form of escapement, the carriage main spring will move the holding dog backward simultaneously with the commencement of the return of the type from platen without having the carriage main spring move the dog rocker, so that the repulsion and return of the keys to normal position is effected directly through the holding dog. By this arrangement the dog rocker or escapement member offers no resistance to the main spring and does not retard the feed of the carriage.

It will be seen that while I have shown my improvement only in connection with an escapement wheel, which is connected with the letter spacing rack of the carriage in the usual manner, it may be connected directly with the letter spacing rack. The release of the carriage simultaneously with the commencement of the return movement of the type from its platen is the earliest carriage release which will insure regular spacing and avoid smutting by the average operator. But there are operators who are so rapid and whose manipulation of the finger keys is so regular that the carriage may be released before the type reach the platen and still effect regular spacing. For this purpose I have provided the arm 26 by means of which the escapement can be readily changed from what is known as the regular escapement heretofore described, to a reverse acting escapement, by disconnecting the wire 27 from arm 25 and connecting the wire to arm 26 shown in Figs. 1, 2, 3 and 8. By this arrangement the holding dog 24 will normally assume a position with its face in line with the face of the spacing dog 18 and the first part of the depression of the finger key will effect the swinging of the holding dog from its normal position, back to the right to the position shown in Figs. 1-3, after which the dog rocker 12 will swing on its pivots 13 from normal position which is the same as normal position of the dog rocker in the direct acting escapement already shown, and at the instant that the dog rocker has swung far enough for the spacing dog 18 to clear the escapement wheel 10, the escapement wheel will move and the carriage will commence its line space movement, which will be before the dog rocker reaches the stop screw 39 and before the type reaches the platen.

For the purpose of alternately engaging the spacing and holding dog with the toothed spacing member, I have mounted them in a rocker to move them in a plane at right angles to the spacing member, which engagement may be effected by moving them at any other angle and by moving them parallel to the path of the said spacing member.

What I claim as new, and desire to secure by Letters Patent is:

1. In a typewriting machine, a letter spacing escapement having a toothed escapement member, a spacing dog, a holding dog arranged to move in the path of the escapement member and having a movement to effect its engagement with said escapement member and means connecting the said holding dog with the finger keys whereby any movement of said escapement member from printing position is continuously prevented during depression of the finger keys.

2. In a letter spacing escapement for a typewriting machine, a toothed escapement member, a spacing dog, and a holding dog, arranged to move parallel to the plane of the escapement member and having a movement to effect its engagement with said escapement member, and means connecting said holding dog with the finger keys whereby a pressure on said keys will continuously hold the escapement member from any movement from printing position and the removal of the pressure will release said escapement member.

3. In a letter spacing escapement for a typewriting machine, a toothed escapement member, a spacing dog, a holding dog having a movement parallel to the plane of the escapement member and having a movement to effect its engagement with said escapement member, the said movements being actuated by means directly connecting the finger keys and the holding dog, whereby the escapement member will be held from any movement from printing position until the final release thereof begins.

4. In a typewriting machine, a letter spacing escapement having a toothed escapement member, a spacing and a holding dog, the holding dog being arranged to swing parallel to the plane of the toothed escapement member, and having a movement to effect its engagement with said toothed escapement member, and having an arm connected to the finger keys, whereby the movements may be controlled and the escapement member held continuously until the finger pressure is released.

5. In a typewriting machine, a letter spacing escapement having a toothed escapement member, a spacing dog and a holding dog to alternately engage the said toothed escapement member, the holding dog being adapted to hold the escapement member continuously from any movement from printing position during pressure upon the finger keys and arranged to move with and in the path of said escapement member instantaneously with the removal of pressure on the finger keys and means to bring said holding dog into such engagement with said toothed escapement member and for so moving said dog from the path of said escapement member.

6. In a typewriting machine a letter spacing escapement having a toothed escapement member, a spacing dog and a holding dog adapted to alternately engage said toothed escapement member, the holding dog being adapted to hold the escapement member continuously from any movement from printing position during pressure upon the finger keys and arranged to move with and in the path of said escapement member instantaneously with the removal of pressure on the finger keys, and a spring for moving said holding dog from the path of said toothed escapement member.

7. In a typewriting machine a letter spacing escapement having a toothed escapement member, a spacing dog and a holding dog alternately coöperating with said escapement member the holding dog being adapted to hold the escapement member continuously from any movement from printing position during pressure upon the finger keys and having a movement in and parallel to the path of said rack and means directly connected to the finger keys for so operating said holding dog.

8. In a typewriting machine a letter spacing escapement having a toothed escapement member, a spacing dog and a holding dog coöperating with said toothed escapement member, means for moving the holding dog from the path of said escapement member before the completion of the letter spacing movement, said holding dog being directly connected to the finger keys and operating to hold the escapement member continuously from any movement from printing position until the pressure upon the finger keys is released.

9. In a typewriting machine a letter spacing escapement having a toothed escapement member, a spacing dog and a holding dog mounted on a dog rocker to move into and out of the path of said escapement member and means for first moving said holding dog parallel to said escapement member into line to engage the same, then for moving said dog rocker to bring said holding dog into engagement with and hold said escapement member from any movement from printing position during pressure upon said means and, upon release of such pressure allowing simultaneous reverse movements of said holding dog.

10. In a typewriting machine, a letter spacing escapement consisting of a toothed spacing member, a dog rocker, a spacing dog and a holding dog mounted on the dog rocker and adapted to move with and in the path of the toothed spacing member and to be alternately swung out of said path by movement of the dog rocker, a spring tensioned to return the dog rocker to normal position, arms on opposite sides of the axis of the holding dog and adapted to form a regular acting escapement when connection with the key levers is made to one of said arms and to form a reverse acting escapement when connection is made to the other arm.

11. In a typewriting machine, a letter spacing escapement having a toothed escapement member, a spacing dog and a holding dog coöperating with the toothed escapement member, the holding dog being arranged to move with the toothed escapement member in its path, and being connected to the finger keys whereby during the first part of their depression, the holding dog will assume a position to hold the carriage in its normal position, and a further depression will effect the release of the spacing dog without releasing the carriage, and whereby the removal of the pressure on the finger keys will effect instantaneous release of the carriage.

12. The combination in a letter spacing escapement for a typewriting machine of a toothed escapement member, a spacing dog, a holding dog adapted to be moved into and out of the path of the escapement member and adapted to move in the path of the escapement member and connections from said holding dog to the key levers whereby depression of a key lever holds said escapement member continuously from any movement from printing position during pressure upon the finger keys.

13. The combination in a letter spacing escapement for a typewriting machine of a toothed escapement member, a spacing dog, a holding dog adapted to be moved into and out of the path of the escapement member and adapted to move in the path of the escapement member and connections from said holding dog to the key levers whereby depression of a key lever moves the holding dog against the escapement member and thereby holds said escapement member continuously from any movement from printing position during pressure upon the finger keys.

14. The combination in a letter spacing escapement for a typewriting machine of a toothed escapement member, a spacing dog, a holding dog adapted to be moved into and out of the path of the escapement member and adapted to move in the path of the escapement member and connections from said holding dog to the key levers whereby depression of a key lever holds said escapement member continuously from any movement from printing position during pressure upon the finger keys and allows movement of the escapement member instantaneously with the beginning of the release of pressure upon the key lever.

15. The combination in a letter spacing escapement for a typewriting machine of a toothed escapement member, a spacing dog, a holding dog adapted to be moved into and out of the path of the escapement member and adapted to move in the path of the escapement member and connections from said holding dog to the key levers whereby depression of a key lever moves the holding dog against the escapement member and thereby holds said escapement member continuously from any movement from printing position during pressure upon the finger keys, and allows movement of the escapement member instantaneously with the beginning of release of the pressure upon the key lever.

16. The combination in a letter spacing escapement for a typewriting machine of a toothed escapement member, a spacing dog, a holding dog adapted to move in the path of the escapement member, a dog support adapted to carry said dogs into and out of the path of the escapement member and connections from said holding dog to the key levers whereby depression of a key lever moves the holding dog into engagement with the escapement member and thereby holds said escapement member continuously from any movement from printing position during pressure upon the finger keys and allows movement of said escapement member instantaneously with the release of pressure upon the key lever.

17. The combination in a letter spacing escapement for a typewriting machine of a toothed escapement member, a spacing dog normally engaging the escapement member, a holding dog adapted to move in the path of the escapement member, a dog support adapted to carry said dogs into and out of the path of the escapement member, connections from said holding dog to the key levers whereby depression of a key lever moves the holding dog into engagement with the escapement member and thereby holds said escapement member from movement and allows movement of the escapement member instantaneously with the release of pressure upon the key lever, and a spring adapted to return the dog support and holding dog to normal position upon release of pressure upon the key lever.

18. The combination in a letter spacing escapement for a typewriting machine of a toothed escapement member, a spacing dog normally engaging the escapement member, a holding dog adapted to move in the path of the escapement member, a dog support adapted to carry said dogs into and out of the path of the escapement member, and connections from said holding dog and said dog support to the key levers whereby depression of a key lever moves the holding dog into engagement with said tooth and thereby holds said escapement member from movement and further depression releases said spacing dog from the escapement member and movement of the escapement member is allowed instantaneously with the release of pressure upon the key levers.

19. The combination in a letter spacing escapement for a typewriting machine of a toothed escapement member, a spacing dog normally engaging the escapement member, a holding dog adapted to move in the path of the escapement member, a dog support adapted to carry said dogs into and out of the path of the escapement member, connections from said holding dog and said dog support to the key levers whereby depression of a key lever moves the holding dog into engagement with said tooth and thereby holds said escapement member from movement and further depression releases said spacing dog from the escapement member and movement of the escapement member is allowed instantaneously with the release of pressure upon the key levers, and a spring adapted to return the dog support and holding dog to normal position upon release of pressure upon the key lever.

20. The combination in a letter spacing escapement for a typewriting machine of a toothed escapement member, a spacing dog normally engaging the escapement member, a holding dog adapted to move in the path of the escapement member, a dog support adapted to carry said dogs into and out of the path of the escapement member, and a single line of connections from said holding dog and said dog support to the key levers whereby depression of a key lever moves the holding dog into engagement with said tooth and thereby holds said escapement member from movement and further depression releases said spacing dog from the escapement member and movement of the escapement member is allowed instantaneously with the release of pressure upon the key levers.

21. The combination in a letter spacing escapement for a typewriting machine of a toothed escapement member, a spacing dog normally engaging the escapement member, a holding dog adapted to move in the path of the escapement member, a dog support adapted to carry said dogs into and out of the path of the escapement member, a single line of connections from said holding dog and said dog support to the key levers whereby depression of a key lever moves the holding dog into engagement with said tooth and thereby holds said escapement member from movement and further depression releases said spacing dog from the escapement member and movement of the escapement member is allowed instantaneously with the release of pressure upon the key levers, and a spring adapted to return the dog support and holding dog to normal position upon release of pressure upon the key lever.

22. In a letter spacing escapement for a typewriting machine, a toothed escapement member, a spacing dog, a holding dog, means for first moving said holding dog in a path parallel to the plane of said toothed escapement member and then into position to engage the same.

23. In a letter spacing escapement for a typewriting machine, a toothed escapement member, a spacing dog normally holding said escapement member, a holding dog normally out of engagement with said escapement member, a support for said dogs having a movement to carry said dogs respectively out of and into the path of said escapement member and means for first moving said holding dog in a path parallel to the plane of said escapement member and then for moving said dog support whereby said holding dog is brought into engagement with said escapement member.

24. In a letter spacing escapement for a typewriting machine, a toothed escapement member, a spacing dog normally holding said escapement member, a holding dog normally out of engagement with said escapement member, a support for said dogs having a movement to carry said dogs respectively out of and into the path of said escapement member and means for first moving said holding dog in a path parallel to the plane of said escapement member and then for moving said dog support whereby said holding dog is brought into engagement with said escapement member, and said escapement member is held from any movement from printing position during pressure upon said means and is released instantaneously with the release of such pressure.

25. In a letter spacing escapement for a typewriting machine, a toothed escapement member, a spacing dog normally holding said escapement member, a holding dog normally out of engagement with said escapement member, a support for said dog having a movement to carry said dogs respectively out of and into the path of said escapement member, means including an arm on said holding dog and connections therefrom to the finger keys for first moving said holding dog in a path parallel to the plane of said escapement member and then for moving said dog support whereby said holding dog is brought into engagement with said escapement member.

26. In a letter spacing escapement for a typewriting machine, a toothed escapement member, a spacing dog normally holding said escapement member, a holding dog normally out of engagement with said escapement member, a support for said dog having a movement to carry said dogs respectively out of and into the path of said escapement member, means including an arm on said holding dog and connections therefrom to the finger keys for first moving said holding dog in a path parallel to the plane of said escapement member and then for moving said dog support whereby said holding dog is brought into engagement with said escapement member and said escapement member is held from any movement from printing position during pressure upon said means and is released instantaneously with the release of such pressure.

In witness whereof I have affixed my signature, in the presence of two witnesses, this 26th day of August 1910.

LOUIS P. DISS.

Witnesses:
 HARRIET WILLIAMS,
 E. M. DUFFY.